United States Patent [19]

Law

[11] Patent Number: 5,052,643
[45] Date of Patent: Oct. 1, 1991

[54] SCREW AND SCREW RELEASABLE STRAIN RELIEF BUSHING WITH A NON-FALL OUT SCREW

[75] Inventor: Joseph P. Law, Scotch Plains, N.J.

[73] Assignee: Heyco Molded Products, Inc., Kenilworth, N.J.

[21] Appl. No.: 498,535

[22] Filed: Mar. 26, 1990

[51] Int. Cl.$^5$ ............................................... F16L 5/00
[52] U.S. Cl. ....................................... 248/56; 411/413; 411/999
[58] Field of Search ................. 248/56; 411/412, 413, 411/508, 913, 999, 352, 353, 970

[56] References Cited

U.S. PATENT DOCUMENTS

| | | | |
|---|---|---|---|
| 2,767,950 | 9/1956 | Bellow et al. | 248/243 |
| 2,927,497 | 3/1960 | Rapata | 411/508 |
| 3,080,184 | 3/1963 | Hays | 411/999 |
| 3,137,336 | 6/1964 | Wing | 411/999 X |
| 3,426,321 | 2/1969 | Peterson, Jr. | 411/413 X |
| 3,493,205 | 2/1970 | Bromberg | 248/56 |
| 3,788,582 | 1/1974 | Swanquist | 248/56 |
| 3,863,421 | 2/1975 | Busch et al. | 52/758 F |
| 4,000,875 | 1/1977 | Jemison et al. | 248/56 |
| 4,040,151 | 8/1977 | Brimm | 411/999 X |
| 4,056,252 | 11/1977 | Simon | 248/56 |
| 4,095,765 | 6/1978 | Aimar | 248/56 |
| 4,157,799 | 6/1979 | Simon | 248/56 |
| 4,262,166 | 4/1981 | Radzishevsky et al. | 248/56 X |
| 4,432,520 | 2/1984 | Simon | 248/56 |
| 4,464,090 | 8/1984 | Duran | 411/103 |
| 4,877,364 | 10/1989 | Sorrentino | 411/999 X |

FOREIGN PATENT DOCUMENTS 2238126 2/1974 Fed. Rep. of Germany.
2316747 10/1974 Fed. Rep. of Germany.

Primary Examiner—David L. Talbott
Attorney, Agent, or Firm—Auslander & Thomas

[57] ABSTRACT

A screw with an unthreaded spaced away radial flange portion on its shank may be tightened and released within a bore without falling from the bore once released. The assembly of the screw and a strain relief bushing permits the conventional strain relief bushing to optionally hold and release cable without risking the loss of the retaining screw from the bushing.

17 Claims, 2 Drawing Sheets

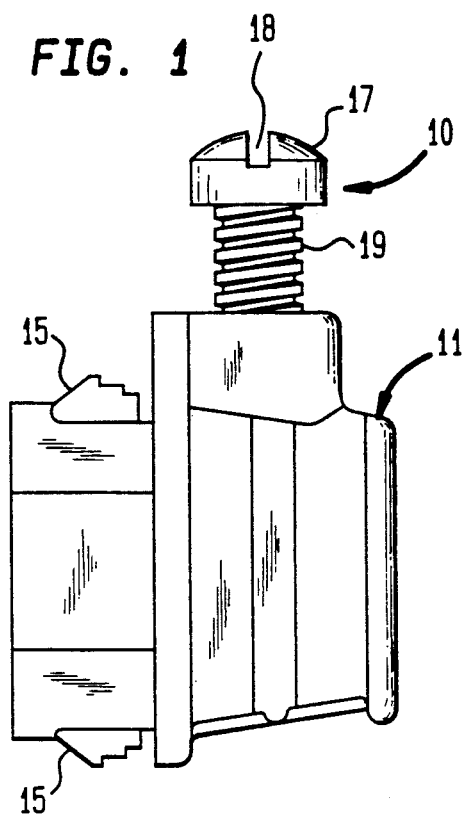
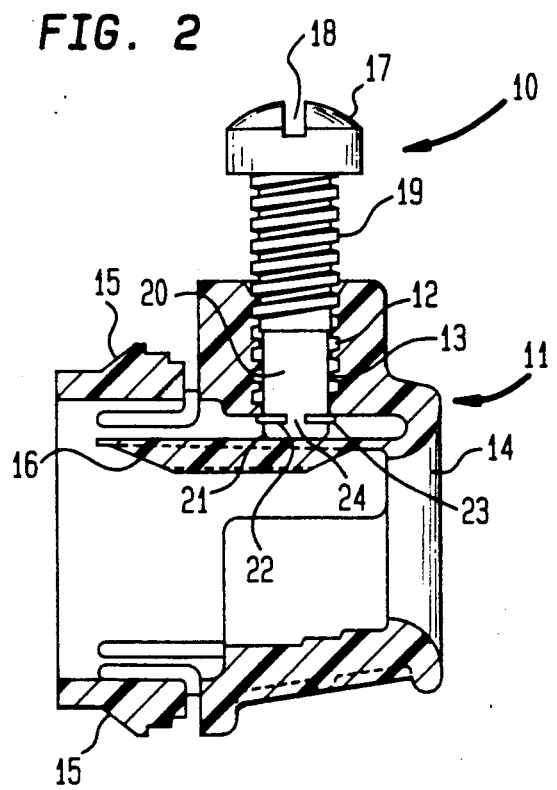

SCREW AND SCREW RELEASABLE STRAIN RELIEF BUSHING WITH A NON-FALL OUT SCREW

BACKGROUND OF THE INVENTION

The present invention is a screw, and a screw in a conventional, screw releasable strain relief bushing. The screw releasable strain relief bushing of the past generally were engageable in an aperture. They were adapted to retain themselves within the aperture and were provided with a screw which is engaged in an opening in the screw releasable strain relief bushing so that it may impinge on a cable or wire to hold the cable in strain relief engagement within the strain relief bushing. Such bushings of the past may have had a protective tongue to protect the cable from abrasion. The purpose of such strain relief bushings was to provide for ready release of the cable when desired or required. A problem involved with such strain relief bushings was that the screws in the bushings, once loosened were free to fall out. The present invention provides a screw and a novel solution to retain a screw in a screw releasable strain relief bushing.

DESCRIPTION OF THE RELATED ART

The prior art seems to be divided into three major categories, screw releasable strain relief bushings, releasable strain relief bushings and captive fasteners.

Exemplary of the screw releasable strain relief bushing is U.S. Pat. No. 4,157,799, where a strain relief bushing is engagable in a panel and provided with a funnel body actuatable by a conventional screw adapted to bear down to effect its strain relief purpose.

U.S. Pat. No. 4,095,765 provides a bushing adaptable for various size cable, including a bore for a self tapping screw adapted to be brought into contact with a flange on a pawl, in order to engage cable.

U.S. Pat. No. 4,056,252 provides a bushing, including a tongue, with an angulated screw adapted to bear upon a cable engaged in the bore of bushing.

German Offlengungschrifft No. 2316747 provides a bushing with a screw actuated mechanism adapted to grasp cable in a bore in a bushing engaged in an aperture.

German Offlengungschrifft No. 2238126 discloses an angulated bushing with a screw mechanism for retaining cable within the bore of the bushing.

Among releasable bushings to retain cable within the bore of a bushing in an aperture, is U.S. Pat. No. 4,432,520, where in lieu of a screw, a rotatable clamping means is provided for retaining cable in the aperture within the bushing.

U.S. Pat. No. 4,000,875 discloses another form of releasable bushing, provided with a hinged releasable cam adapted to hold cable within a bushing.

U.S. Pat. No. 3,788,582 provides a retained rotatable clamp within a bushing, that varies the opening within the bushing, in order to retain cable within a bushing.

U.S. Pat. No. 3,493,205 provides a plug member which may or may not be releasable, and which may be retained on a web, attached to the bushing, for effecting holding of cable within a bushing.

The following prior art provides retaining means to retain captive panel fasteners.

U.S. Pat. No. 4,464,090 provides a C shaped ring, trapped in a grommet assembly, for retaining a threaded screw in an aperture.

U.S. Pat. No. 3,863,421 provides a barrel nut assembly with a sleeve bolt. There is a compressible retaining ring, which is then engagable to retain the barrel nut assembly.

U.S. Pat. No. 2,767,950 discloses a bush fastener with a C ring adapted to removably retain a bush fastener within an aperture, so that the bush fastener may not fall out.

These these disparate arts neither show nor suggest the novel solution for retaining a threaded screw against falling out.

SUMMARY OF THE INVENTION

The present invention provides a non fallout screw, particularly adaptable for use in a screw releasable strain relief bushing.

The screw of the present invention is conventionally threaded with male threads which ride in conventional female threads in a bore. The thread is preferably a high torque acme thread, the thread having more or less of a square configuration. The screw is adapted to impinge upon cable passing transversely through a strain relief assembly. The screw may impinge upon a tongue, which then is impingable upon cable passing through a strain relief assembly.

The screw itself of the present invention is preferably a molded plastic screw, provided at one end with a radial flange portion or a plurality of radial flange portions. It is preferable to have at least two contiguous flange portions. The flange portion is spaced away from the end portion of the threads, thus providing an unthreaded area, of lesser diameter than the outside diameter of the threads, along the shank of the screw, between the radial flange portion and the conventional threads.

The radial flange portion is thin and flexible. The screw is preferably made of a hard plastic. The radial flange portion is preferably integral with the screw. Upon insertion of the screw into the female threaded portion of a bushing or other structure, the flexibility of the radial flange portion enables it to pass or to be driven, through the threads, once the lower portion of the conventional male thread is engaged with the female threads of the screw releasable strain relief bushing assembly.

The length of the shank of the screw is sufficient, such that the radial flange portion may pass through the female threaded portion and extend, toward the tongue, or to the cable in the strain relief bushing when the screw holds the cable within the bushing.

The radial flange portion is preferably of about the same diameter as the screw threads. The radial flange portion may also be of slightly greater diameter so that once past the end of the bore of the female thread, the radial flange portion naturally extends and functions as a retainer, yet is freely rotatable and extending from the shaft, as the threads of the screw are driven down through the female threads in the bore.

Upon withdrawal of the screw, the radial flange portion is disengagable and adapted to pass or be pulled through the helix of the female threaded bore. At a point, the conventional threads of the screw release from the female threads. At this point, the screw is retained within the bore by the radial flange portion on the shank.

A continued unscrewing does not release the screw held within the female bore by the radial flange portion, since the flexible radial flange portion is transverse to the shank of the screw and does not normally track within the helix of the female bore.

The radial flange portion preferably comprises at least two pieces which allows a flexing of the radial flange portion, so that it does not ride the helix of the female threaded bore to naturally unscrew.

Retightening of the screw only requires the reengagement of the male threads, usually helical, of the screw. The the screw then passes through the female threads and again holds the cable passing transversely through the screw releasable strain relief bushing.

When the screw of the present invention is used with a screw releasable strain relief bushing, the radial flange portion need only be spaced away on the shank from the threads of the screw in order to be effective. It might be preferable for the radial flange portion to be able to loosely extend beyond the bore of the screw releasable strain relief bushing when the screw threads are disengaged. The length of the screw when the radial flange portion extends beyond the bore may limit the number of cable sizes that can be used in a single screw releasable strain relief bushing.

The radial flange portion does not ride up or down in the female threads when the screw is turned when the threads are not engaged. The screw though can be forceably withdrawn notwithstanding the radial flange portion when the threads are disengaged.

According to the present invention a screw is provided that has a shank, a helical threaded portion along the shank and an unthreaded portion. There is a radial flange portion axially spaced away from the threaded portion near the end of the screw. The radial flange portion may be integral to the screw and may be resilient or may be substantially the diameter of the screw threads or about the diameter of the screw threads. Preferably, the radial flange portion includes at least one gap and may have several segments.

The screw may be plastic and have molded threads. The radial flange portion may be integral to the screw and may be resilient and substantially the diameter of the screw threads or about the diameter of the screw threads.

A molded plastic strain relief bushing also may have a body with an opening for receiving a cable, shoulders to attach it in an aperture, a radial bore opening into the cable receiving opening. The radial bore may include threads and a screw to be screwed into the bore to hold the cable in strain relief engagement. The screw includes a shank, a threaded portion along the shank, an unthreaded portion and a radial flange portion. The radial flange portion is axially spaced away from the threaded portion and near the end of the screw. The radial flange portion may be integral to the screw and may be resilient, or may be substantially the diameter of the screw threads or about the diameter of the screw threads. Preferably, the radial flange portion includes at least one gap and may have several segments.

The screw in the strain relief bushing may be plastic and have molded threads. The radial flange portion may be integral to the screw and may be resilient and substantially the diameter of the screw threads, or about the diameter of the screw threads.

The threads in the radial bore may terminate spaced away from the cable receiving opening and the radial bore may include an end, at the cable receiving opening which has a diameter slightly less than the inside diameter of the threads in the bore. The the radial flange portion may be positioned a greater distance from the end of the threads on the screw than the length of the bore and the unthreaded portion of the shank of the screw may extend beyond the radial bore with the radial flange portion also extending beyond the bore.

When the threads in the radial bore terminate spaced away from the cable receiving opening the radial bore may include an end at the cable receiving opening having a diameter slightly less than the inside diameter of the threads in the bore, or the radial flange portion may be positioned a greater distance from the end of the threads on the screw than the length of the bore, or the unthreaded portion of the shank of the screw may be of greater length than the radial bore when the radial flange portion extends beyond the bore.

Although such novel feature or features believed to be characteristic of the invention are pointed out in the claims, the invention and the manner in which it may be carried, may be further understood by reference to the description following and the accompanying drawing.

BRIEF DESCRIPTION OF THE DRAWINGS

FIG. 1 is a side elevation of a screw releasable strain relief bushing including a screw of the present invention.

FIG. 2 is a section of FIG. 1, showing the screw of the present invention in screw threaded bushing bore.

DETAILED DESCRIPTION

Figure 3:
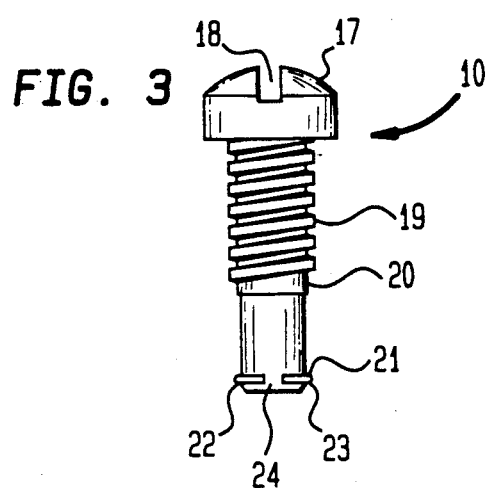
FIG. 3 is a front elevation of the screw of the present invention.

Referring now to the figures in greater detail, where like reference numbers denote like parts in the various figures.

The screw 10 is shown in FIGS. 1 and 2, engaged in a screw releasable strain relief bushing 11. The strain relief bushing 11 is a conventional bushing with a bore 12, which includes helical female threads 13 and opening 14 therethrough, through which cable may be threaded. The strain relief bushing 11 is provided with flexible shoulders 15, so that it may be engaged within an aperture in a panel.

The strain relief bushing 11 has a tongue 16, upon which the end of the screw 10 impinges, so that as the screw 10 is moved inward through the bore 12, carried by the female threads 13, the tongue 16 is impinged upon cable (not shown) to effectively hold the cable in strain relief engagement.

The screw 10 is provided with a conventional head 17, which preferably includes a slot 18 for a screwdriver. Of course, a Phillips ® head might also be provided.

The screw 10 has male threads 19. The threads 19 extend only partially along the length of the shank 20 of the screw 10. A radial flange portion 21 extends from the shank 20, near the end of the screw 10. The flange 21, as shown, comprises flange segments 22, 23, which are spaced apart by gaps 24.

Figure 5:
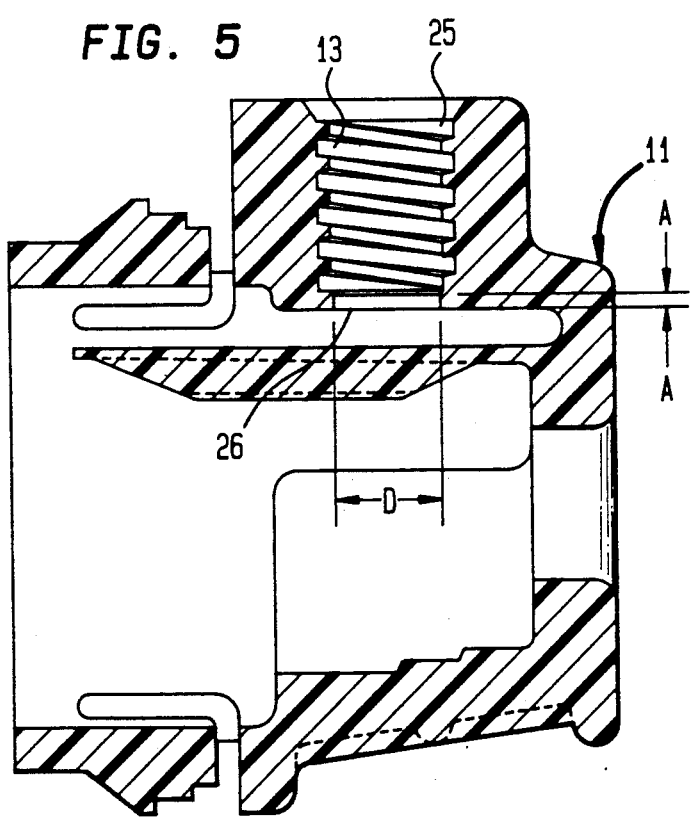
FIG. 5 is a section of another preferred embodiment of the screw releasable strain relief bushing FIG. 1, showing a variant screw threaded bushing bore.

As shown in FIG. 5 another preferred embodiment of the screw releasable strain relief bushing 11 has a bore 25 which is set back from the bore end 26 by a distance A. The bore end 26 is has a diameter D which is preferably slightly less than the inside diameter of the female threads 13.

OPERATION

In operation, the screw 10 of the present invention, with its radial flange portion 21, is inserted into the bore 12. The radial flange portion 21 flexes and passes through the female threads 13 until the male threads 19 engage the female threads 13.

At that point, in a preferred embodiment, as shown in FIG. 2, the radial flange portion 21, preferably extends beyond the bore 12 in contact with the tongue 16.

The strain relief bushing 11 is conventionally engaged in an aperture. A cable is threaded through the opening 14. The screw 10, then, is screwed down against the tongue 16, setting the cable in strain relief engagement within strain relief bushing 11.

At such time as it is necessary to release the cable, the screw 10 is unscrewed, relieving the grasp of the tongue 16.

In the event that in the unscrewing procedure, the screw 10 is withdrawn so that the male threads 19 are released from the female threads 13, then the screw is nonetheless held, engaged within the bore 12, so that it cannot fall out, held by the radial flange portion 21, which is engaged in the female threads 13.

Continued counterclockwise rotation of the screw 10 will not cause the radial flange portion 21 to track up the female threads 13 and expel the screw 10. The radial disposition and flexibility of the radial flange portion 21, causes the radial flange portion 21 to stay in position with regard to the female threads 13.

Where size constraints are of no consequence, the unthreaded portion of the shank 20 may allow the radial flange portion 21 to extend beyond the length of the bore 12, so that once the male threads 19 have been disengaged by unscrewing, the shank 20 of the screw 10 freely rests within the bore 12 between the radial flange portion 21 and the end of the male threads 19.

Although the screw 10 will not fall out of the bore 12 with the male threads 19 disengaged from the female threads 13, the screw 10 can be forceably withdrawn from the bore 12.

The withdrawal of the screw 10, or its insertion into the bore 12, does not break the radial flange portion 21, whose flexibility permits the passage past the female threads 13, either for insertion or screwing in of the screw 10, or the forceable removal of the screw 10 with the threads 19 disengaged from the female threads 13.

Figure 4:
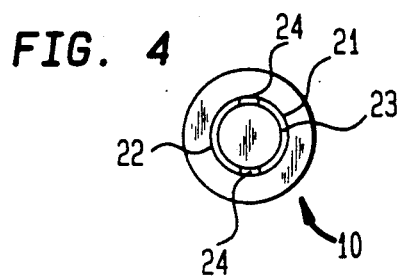
FIG. 4 is a bottom plan view of FIG. 3.

As shown in FIGS. 2, 3 and 4, the radial flange portion 21 comprises flange segments 22, 23 with gaps 24 between the flange segments 22, 23.

The gaps 24 enable an easier flexing of the radial flange portion 21, so that the radial flange portion 21 may more easily disengage the female threads 13, so as not to track up the female threads 13 in the bore 12, as the screw 10 is being unscrewed.

The gaps 24 further reduce the stress on the radial flange portion 21 so that the flange segments 22 and 23 are less likely to be damaged, particularly in their passage through the bore 12, for the insertion and tightening of the screw 10, or even with regard to the forceable removal of the screw 10, with the male threads 19 disengaged.

An advantage of the use of the radial flange portion 21 is that it can be integrally molded into a plastic screw 10, thus saving the labor, or machine operation of applying of an additional part to the screw 10.

By being integral with the screw 10, the radial flange portion 21 also obviates the need for retaining means to retain the radial flange portion 21 on the shank 20 of the screw 10. Were a conventional C ring, for instance, to be employed, there would always be the possibility of the ring itself being disengaged and failing, allowing the screw 10 to fall out.

There is also the advantage in using the radial flange portion 21 of the present invention, that the screw 10 itself, while not falling out upon release of the threads 19 is nonetheless, removable and replaceable. For instance, an expandable C ring might not be removable at all without destruction of the bore 12 of the strain relief bushing 11.

In another preferred embodiment of the screw releasable strain relief bushing 11 of the present invention as shown in FIG. 5 the female threads 13 terminate before the bore end 26. The female threads 13 are set back a distance A. The diameter D of the bore end 26 is less than the diameter of the female threads 13 and less than the usual diameter of the axial flange portion 21. The unthreaded portion of the shank 20 preferably is longer than the length of the bore 25. When the screw 10 is engaged in the bore 25 with the radial flange portion 21 extending beyond the bore end 26 and the male threads 19 are free of the female threads 13, the screw 10 can only be removed from the bore 25 by forceably being pulled out. The radial flange portion cannot engage the threads 13 and track out of the bore 25. The screw 10 rotates freely beyond the bore end 26 when the screw 10 is unscrewed. The radial flange portion 21 is generally wider that the bore end 26.

Within the scope of the present invention, though not shown in the figures, would be included the use of more than two gapped flange segments, as well as an ungapped radial flange portion 21.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A non fallout screw for use in an electrical cable strain relief bushing, said screw being integral and comprising molded plastic, said screw including a shank, a threaded portion along said shank, said shank further including an unthreaded portion, said unthreaded portion of lesser outside diameter than said threads, and a radial flange portion, said radial flange being planar; thin and resilient; and substantially the diameter of said screw threads, said radial flange portion axially spaced away from said threaded portion, said radial flange portion near the end of said screw.

2. The invention of claim 1 wherein said radial flange portion is slightly greater than the diameter of said screw threads.

3. The invention of claim 1 wherein said radial flange portion includes at least one gap.

4. The invention of claim 3 wherein said radial flange portion includes a plurality of segments.

5. The invention of claim 1 wherein said threads are of substantially square configuration.

6. A molded plastic strain relief bushing including a body, an opening therethrough adapted to receive a cable, means to attach said strain relief bushing in an aperture, a radial bore, said radial bore opening into said cable receiving opening, said radial bore including threads, and a non fallout screw, said screw engagable in said bore to hold said cable in strain relief engagement, said screw being integral and comprising molded plastic, said screw including a shank, a threaded portion along said shank, said shank further including an unthreaded portion, said unthreaded portion of lesser outside diameter than said bore threads, and a thin resilient radial flange portion, said radial flange being planar; thin and resilient; and substantially the diameter of said screw threads, said radial flange portion axially spaced away from said threaded portion, said radial flange portion near the end of said screw.

7. The invention of claim 6 wherein said radial flange portion is slightly greater than the diameter of said screw threads.

8. The invention of claim 6 wherein said radial flange portion includes at least one gap.

9. The invention of claim 7 wherein said radial flange portion includes a plurality of segments.

10. The invention of claim 6 wherein said threads in said radial bore terminate spaced away from said cable receiving opening.

11. The invention of claim 10 wherein said radial bore includes an end at said cable receiving opening having a diameter slightly less than the inside diameter of said threads in said bore.

12. The invention of claim 10 wherein said radial flange portion is positioned a greater distance from the end of said threads on said screw than the length of said bore.

13. The invention of claim 10 wherein said unthreaded portion of said shank of said screw is of greater length than said radial bore, and said radial flange portion is adapted to extend beyond said bore.

14. The invention of claim 6 wherein said radial bore includes an end at said cable receiving opening having a diameter slightly less than the inside diameter of said threads in said bore.

15. The invention of claim 6 wherein said radial flange portion is positioned a greater distance from the end of said threads on said screw than the length of said bore.

16. The invention of claim 6 wherein said unthreaded portion of said shank of said screw is of greater length than said radial bore, and said radial flange portion is adapted to extend beyond said bore.

17. The invention of claim 6 wherein said threads are of substantially square configuration.

* * * * *